No. 659,608. Patented Oct. 9, 1900.
J. McCORKELL & N. McEACHERN.
WEED CUTTER.
(Application filed Feb. 6, 1900.)
(No Model.)
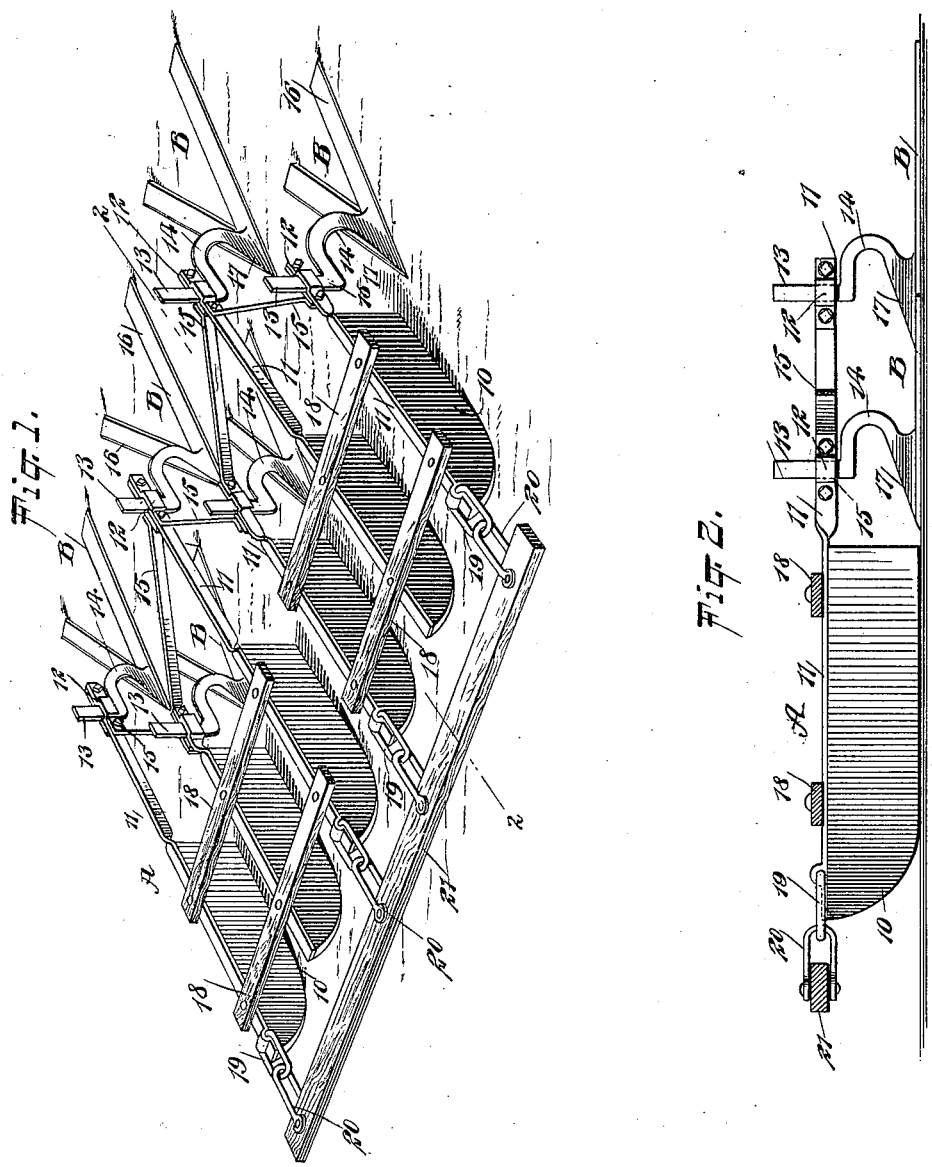
WITNESSES:
William P. Gaebel.
INVENTORS
James McCorkell
Neil McEachern
BY
ATTORNEYS

United States Patent Office.

JAMES McCORKELL AND NEIL McEACHERN, OF HELIX, OREGON.

WEED-CUTTER.

SPECIFICATION forming part of Letters Patent No. 659,608, dated October 9, 1900.

Application filed February 6, 1900. Serial No. 4,165. (No model.)

*To all whom it may concern:*

Be it known that we, JAMES McCORKELL and NEIL McEACHERN, citizens of the United States, residing at Helix, in the county of Umatilla and State of Oregon, have invented a new and Improved Weed-Cutter, of which the following is a full, clear, and exact description.

One object of the invention is to construct a weed-cutter which will also serve as a cultivator and which will be light of draft and will not clog and which will be so constructed that the blades or shares can be adjusted for effective work in all kinds of soil.

Another object of the invention is to provide a weed-cutter which will automatically accommodate itself to any inequalities of surface and which may be constructed in a group of independent sections.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both figures.

Figure 1 is a perspective view of the improved machine, and Fig. 2 is a longitudinal vertical section taken practically on the line 2 2 of Fig. 1.

The machine consists of one or more sections A, which may be connected by a doubletree or a like device, or the sections may be used independently. Each section consists mainly of runners 10 and straps or bars 11, secured to the upper surfaces of the runners and extending any desired distance beyond the rear thereof. The rear end of each strap or bar 11 is provided with a clamp 12, and the clamps receive the vertical upper sections 13 of gooseneck-shanks 14, and the shanks are adjustable in the clamps. Usually three runners 10 are included in a section, although a greater or less number may be used, and the straps or bars 11 on the central runners of a section extend farther rearward than those on the inner and outer runners, as shown in Fig. 1. The clamps 12 are located at the rear ends of the straps or bars 11, and the rear or projecting portions of the said straps or bars 11 are strengthened by diagonal braces 15, which usually extend from clamp to clamp, as is also best shown in Fig. 1.

Each shank 14 is connected with the forward portion of a triangular share or blade B, and each share or blade consists of two side pieces 16, which meet to form a point at their forward ends and which diverge or spread apart at their rear ends. Usually the length of the blades B is about twenty-four inches and the width of the cut of the blades is about twenty inches. These members 16 of the share or blade may be flat or they may be given a downward transverse inclination, and their outer longitudinal edges are their cutting edges; but at the forward or pointed end of each share or blade B the material is carried upward and rearward to a connection with the shank 14 belonging to the blade, and this shank connects with the blade at some distance rearward of the point, as shown best in Fig. 2. The forward raised portion 17 of the blade inclines from a longitudinal central line in direction of the cutting edges of the blade, so that the weeds severed by the advanced portion of the share will be distributed to either side of the share before the weeds can reach the shank and tend to clog the action of the blade. The gooseneck-shank 14 tends materially to this end, since the upper portion of the shank or that portion which is attached to a bar or strap 11 may be quite near the point, while that portion of the shank which is liable to engage with the weeds is located some distance rearward from the point.

It will be observed that owing to the variation in the length of the straps or bars 11 an alternate arrangement of blades is obtained and a rear and a forward row are provided, the blades or shares of the forward row being intermediate of those of the rear row. The runners 10 of each section are preferably connected by cross-bars 18.

Under the construction shown the outer and inner runner of each section is provided at its front with a link 19, which links are in connection with links 20 secured to a draftbar 21 of any desired construction; but when the sections are used independently each section is provided with a separate draft-bar.

It is evident from the foregoing description that the machine is well adapted for the purpose intended, that it is exceedingly light of draft, that it will not clog, and that it is adjustable, and the various sections will accommodate themselves automatically to any irregularities in the surface over which the machine will be drawn.

Having thus described our invention, we claim as new and desire to secure by Letters Patent—

1. In a weed-cutter, a draft-bar, runners connected with the draft-bar, and blades adjustably connected with the runners, each blade being provided with a gooseneck-shank, for the purpose set forth.

2. In a weed-cutter, a draft-bar, runners pivotally connected with the draft-bar, extensions from the rear of said runners, gooseneck-shanks having straight upper sections adjustable in the extensions of the runners, and triangular blades, each blade comprising two members forming a point at their forward ends, their rear ends diverging, the said gooseneck-shank being attached to the blade rearward of its point, each blade being provided with a tapering offset at its point, extending from the extreme forward end to the said shank and having a side beveled in opposite directions from a center line, as described.

3. In a weed-cutter, the combination, with a draft-bar, runners pivotally connected with the draft-bar, the runners being provided with rear extensions in two lengths, the said runners being so arranged that the shorter extensions are between the longer ones, of triangular blades, each comprising side members brought to a point at their forward ends and diverging at their rear ends, gooseneck-shanks secured to the said blades rearward of their points, each gooseneck having an upper straight section adjustably connected with the rear extremity of the extension of a runner, each of the said blades being provided with an offset at its forward end, inclined from the point upward and rearward to the shank and inclined in direction of opposite sides of the share from a central longitudinal line, as described.

In testimony whereof we have signed our names to this specification in the presence of two subscribing witnesses.

JAMES McCORKELL.
NEIL McEACHERN.

Witnesses:
B. S. BURROUGHS,
MOSES TAYLOR.